United States Patent [19]
Korbel et al.

[11] Patent Number: 6,011,375
[45] Date of Patent: Jan. 4, 2000

[54] DISC DRIVE SPINDLE MOTOR WITH PROGRAMMABLE CURRENT CONTROL

[75] Inventors: Garry E. Korbel, New Praque; Christopher L. Hill, Apple Valley, both of Minn.

[73] Assignee: Seagate Technology, Inc., Scotts Valley, Calif.

[21] Appl. No.: 08/979,888

[22] Filed: Nov. 26, 1997

Related U.S. Application Data

[60] Provisional application No. 60/051,586, Jul. 2, 1997.

[51] Int. Cl.$^7$ ................................................ G05B 11/28
[52] U.S. Cl. ...................... 318/599; 318/434; 318/811; 388/804
[58] Field of Search ............................... 318/599, 685, 318/696, 254, 439, 799–802, 810, 811, 503; 388/804, 811, 819, 829, 831

[56] References Cited

U.S. PATENT DOCUMENTS

| | | | |
|---|---|---|---|
| 5,017,855 | 5/1991 | Byers et al. ............................ | 318/811 |
| 5,457,364 | 10/1995 | Bilotti et al. ............................ | 318/434 |
| 5,640,943 | 6/1997 | Tasaka et al. ............................ | 123/399 |
| 5,786,681 | 7/1998 | Kalpathi ................................... | 318/701 |

*Primary Examiner*—Brian Sircus
*Attorney, Agent, or Firm*—Westman, Champlin, Kelly, P.A.

[57] ABSTRACT

A disc drive includes an apparatus for limiting coil energization current to a programmable value. A current sensor is operatively coupled to a coil and provides a signal which is indicative of current flow through the coil. A configurable voltage source is responsive to a control signal. A current inhibitor is operatively coupled to the output of the current sensor and the voltage source such that the current inhibitor selectively inhibits current flow through the coil based on results of a comparison between the current sensor signal and a voltage supplied by the configurable voltage source. A method of calibrating a current control threshold is also provided as well as a method of controlling the coil energization current.

19 Claims, 8 Drawing Sheets

DISC DRIVE SPINDLE MOTOR WITH PROGRAMMABLE CURRENT CONTROL

CROSS-REFERENCE TO RELATED APPLICATION

This application claims the priority of an earlier filed co-pending provisional patent application Ser. No. 60/051,586, filed Jul. 2, 1997 entitled METHOD OF REDUCING DETECTOR OFFSET AND NORMALIZING CONVERTER GAIN.

FIELD OF THE INVENTION

The present invention relates to disc drive spindle motors. More specifically, the present invention relates to an apparatus for controlling energization current to a disc drive spindle motor and a method of calibrating the apparatus.

BACKGROUND OF THE INVENTION

Disc drives are the primary devices employed for mass storage of computer programs and data used in computer systems. Within a disc drive, a load beam supports a hydrodynamic air bearing (or slider) proximate a rotating magnetic disc. The load beam supplies a downward force that counteracts the hydrodynamic lifting force developed by the air bearing. The slider carries a magnetic transducer for communicating with individual bit positions on the rotating magnetic disc.

Upon disc drive power-up, it is necessary for the disc to accelerate from an at rest, non-rotating condition, to an operational condition in which the disc rotates with sufficient speed that the slider is able to fly over the disc at an operational height.

In order to initiate rotation, various resistive forces must be overcome. First, during rest, every head in the drive generally sticks to the disc surface to some degree, this is known as stiction. The stiction due to the magnetic heads increases proportionally with the number of magnetic heads employed in the drive. Second, some disc drives employ additional air bearings between the rotational and non-rotational members of the drive. For such drives, additional stiction is also present between such air bearing surfaces. Thus, the excess of spindle motor torque over the resistive forces such as stiction, goes into accelerating the rotational mass.

In the field of disc drives, it is advantageous to provide a disc drive which can initiate disc rotation and achieve operational disc speed as quickly as possible. In disc drive spindle motors, generally, spindle torque is proportional to the amount of current which is caused to flow through the coils of the spindle motor. Thus, accurate and precise control of coil current is advantageous in repeatedly providing the maximum safe energization current to the spindle motor to generate the maximum safe torque.

The present invention addresses these and other problems, and offers other advantages over the prior art.

SUMMARY OF THE INVENTION

A disc drive includes an apparatus for limiting coil energization current to a programmable value. The apparatus further includes a detector having a first input, a second input, and an output providing an output signal which is responsive to an equilibria condition between the first and second inputs. The apparatus also includes a current sensor which is coupled to the coil and the first input such that the current sensor provides a signal to the detector which is indicative of current flow through the coil. A configurable voltage source is coupled to the second input and provides a signal to the second input which is based upon a configuration signal. A controller is coupled to the configurable voltage source and provides the configuration signal to the configurable voltage source. A current inhibitor is coupled to the output of the detector and the coil such that the current inhibitor selectively inhibits current flow through the coil based on the output signal.

A method of calibrating the coil energization threshold current is also provided. The method includes the step of setting the configurable voltage source to an initial voltage which is different from an expected voltage of a reference voltage source. Additionally, the voltage of the configurable voltage source is compared to a voltage of the reference voltage source to determine if the two voltages are substantially equal. Further, the configurable voltage source is stepped such that the voltage provided by the configurable voltage source is changed stepwise toward the expected value of the reference voltage source. The stepping continues until the comparing step registers that the two voltages are within a desired range of one another. The calibrating method further comprises the step of storing the setting of the configurable voltage source which corresponds to the matching voltage of the configurable voltage source.

DETAILED DESCRIPTION OF THE PREFERRED EMBODIMENTS

Figure 1:
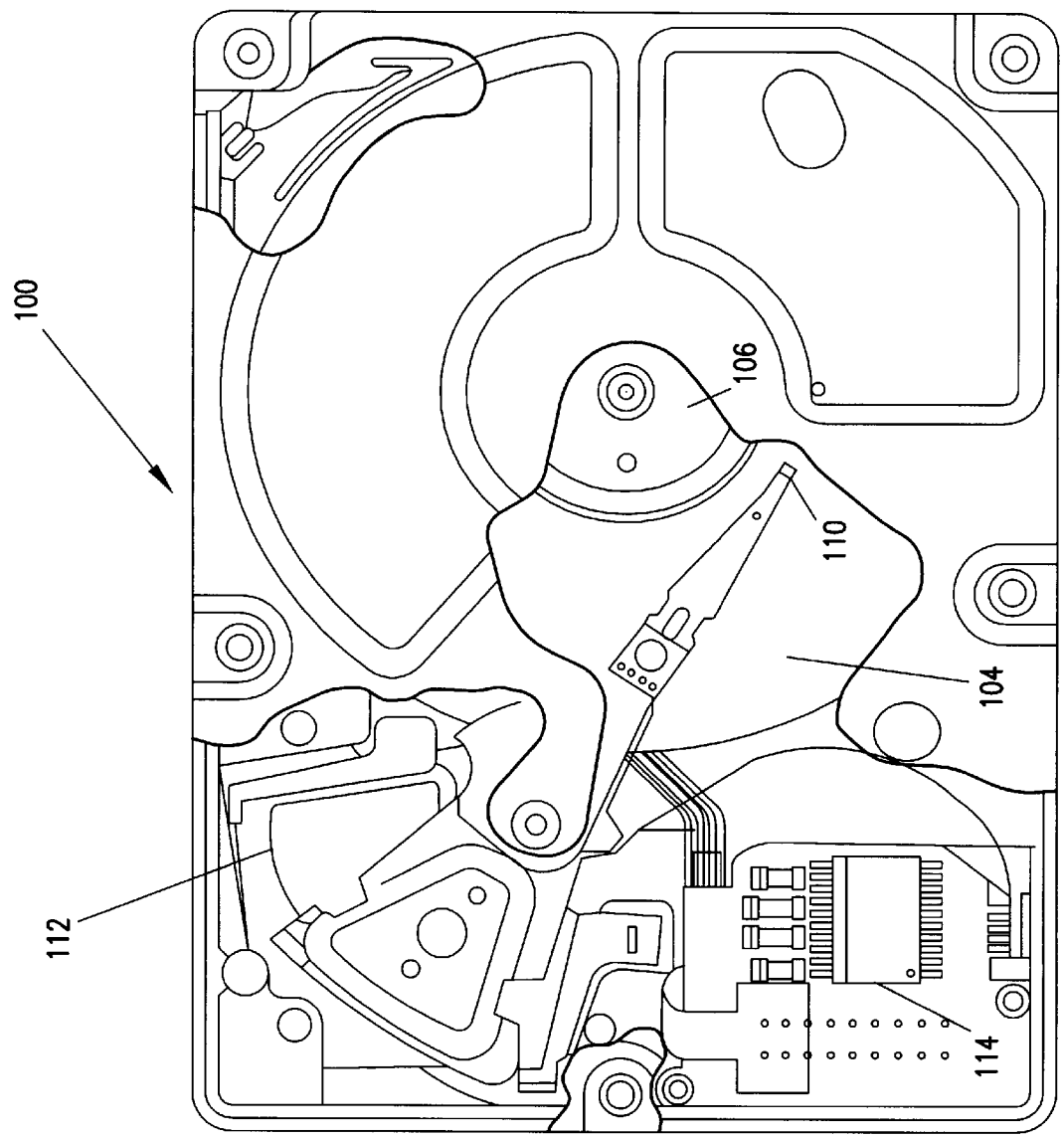
FIG. 1 is a diagrammatic view of storage drive 100.

FIG. 1 is a block diagram of storage drive 100 in accordance with the present invention. Storage drive 100 is coupled to a computer (not shown) such that the computer transfers data to and reads data from storage drive 100. Storage drive 100 includes disc 104, spindle 106, spindle motor 108, transducer head 110, actuator 112, and disc controller 114.

Disc 104 is fixed about spindle 106. Spindle 106 is coupled to spindle motor 108 such that energization of spindle motor 108 causes spindle 106 and disc 104 to rotate. When disc 104 rotates, transducer head 110 flies above disc 104 and is magnetically or optically coupled to the surface of disc 104. Actuator 112 is coupled to disc controller 114 and is adapted to move transducer head 110 across the surface of disc 104 in response to an actuation signal from disc controller 114.

Disc controller 114, in addition to being coupled to actuator 112, is coupled to spindle motor 108 and the computer. Disc controller 114 provides the energization signal to spindle motor 108. The energization signal which disc controller 114 provides to spindle motor 108 determines the extent to which spindle motor 108 rotates spindle 106 and disc 104. Thus, because disc controller 114 controls actuator 112 and spindle motor 108, disc controller 114 essentially controls motion in storage drive 100. Disc controller 114 also provides information, which is to be written to disc 104, to transducer head 110 and receives information, which is read from disc 104, from transducer head 110.

Figure 2:
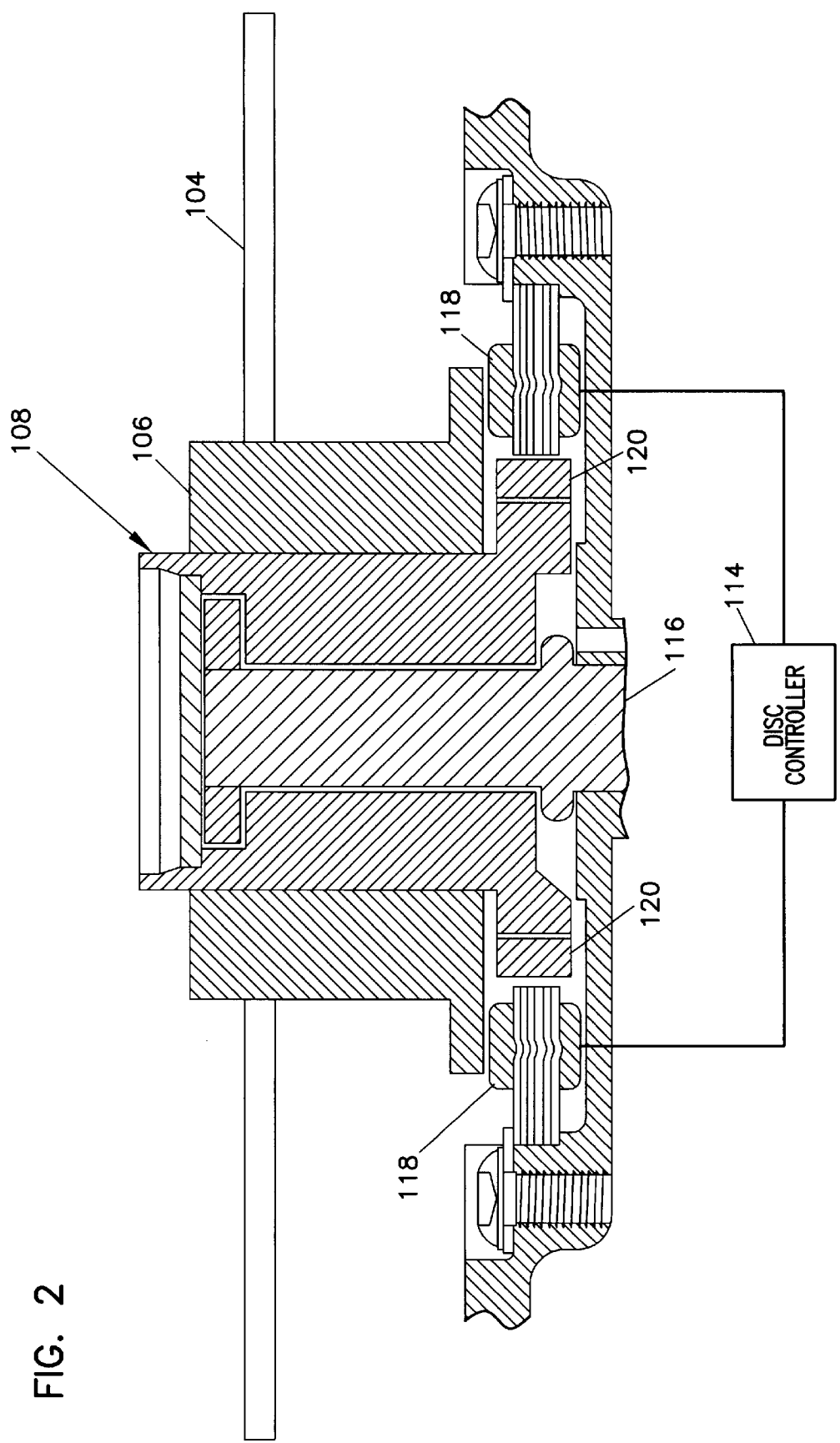
FIG. 2 is a section view of spindle motor 108 coupled to disc controller 114.

FIG. 2 is a diagrammatic view of spindle motor 108 and disc controller 114. Spindle motor 108 includes rotatable spindle 106, non-rotatable member 116, coils 118, and permanent magnet members 120.

Disc 104 is disposed on spindle 106 such that disc 104 and spindle 106 rotate together. Typically, spacers and disc clamping or retaining members are also provided, but have not been shown for the sake of clarity. Spindle 106 is rotatably coupled to fixed member 116 such that spindle 106 rotates about fixed member 116. Spindle motor 108 further includes coils 118 which generate magnetic fields when supplied with an energization current. Spindle 106 also includes permanent magnets 120 which are magnetically couplable with coils 118 to generate torque. As can be seen, the torque which spindle motor 108 generates is proportional to the current supplied to coils 118. It should be noted that the above-described spindle motor is set forth for illustrative purposes only, and is not intended to limit the present invention.

Figure 3:
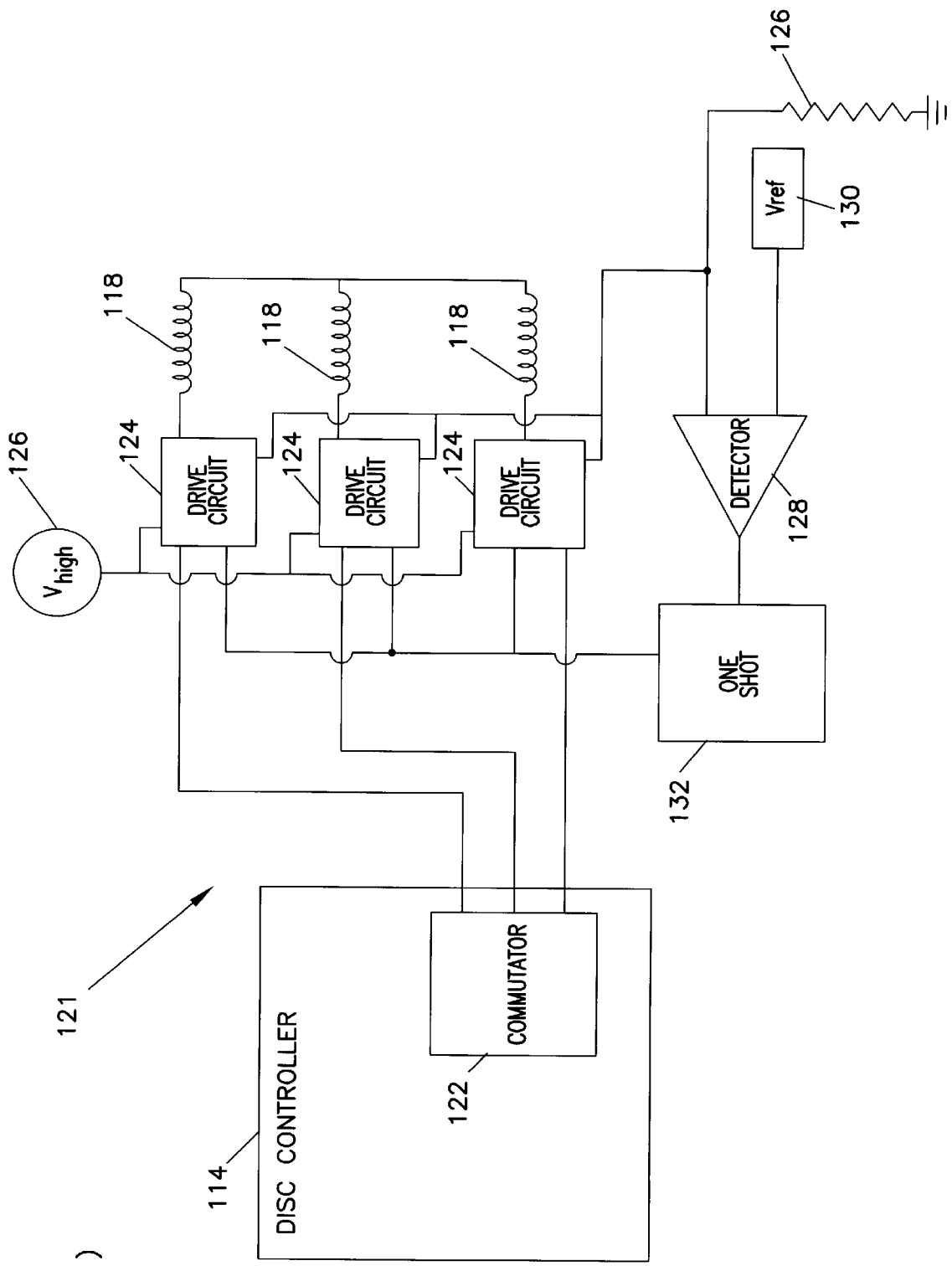
FIG. 3 is a block diagram of circuit 121 for limiting drive current in accordance with the prior art.

FIG. 3 is a block diagram of circuit 121 for controlling current to spindle motor 108 in accordance with the prior art. Typically, a commutation circuit 122 is part of controller 114. FIG. 3 shows commutator circuit 122 coupled to drive circuits 124. Commutator 122 provides selective energization signals to certain ones of drive circuits 124 such that the certain ones of coils 118 are energized or de-energized. In this manner, commutator 122 commutates coils 118 to generate a rotating magnetic field which rotates the disc.

Drive circuits 124 are coupled to current source 125 and to ground, through current sense resistor 126. Drive circuits 124 are adapted to selectively couple their outputs to current source 125 or ground based upon control signals received by the drive circuits. The outputs of drive circuits 124 are coupled to first ends of coils 118 such that individual ones of coils 118 may be selectively coupled to current source 125 or ground and thus may be energized or de-energized selectively. Opposite ends of coils 118 are coupled together.

Current sense resistor 126 is also coupled to a first input of detector 128 such that a voltage is provided to the first input of detector 128 based upon current passing through current sense resistor 126. A reference voltage ($V_{ref}$) 130 is provided to a second input of detector 128 for comparison to the current sense voltage provided at the first input by current sense resistor 126. Detector 128 is adapted to toggle its output when inputs provided thereto are equal as is known in the art. The output of detector 128 is coupled to one shot circuit 132 such that when the output of detector 128 is toggled, one shot 132 generates a pulse. One shot 132 is further coupled to drive circuits 124 such that the pulse generated by one shot 132 inhibits current flow through coils 118.

Circuit 121 controls current to coils 118 in the following manner. Upon power-up, commutator 122 selects one of drive circuits 124 and generates a signal which causes the selected drive circuit 124 to energize corresponding coils 118. Current begins to flow through the corresponding coil 118 which current flow increases with time due to the inductive nature of the coil load. The current which flows through selected coils 118 is also caused to flow through current sense resistor 126. Current sense resistor 126 is configured such that a first end of resistor 126 is coupled to ground while a second end of resistor 126 is coupled to the first input of detector 128. Thus, current sense resistor 126 provides the current sense voltage to the first input of detector 128 which is proportional to the current flowing through current sense resistor 126, and thus proportional to the current flowing through the selected coils 118.

Figure 4:
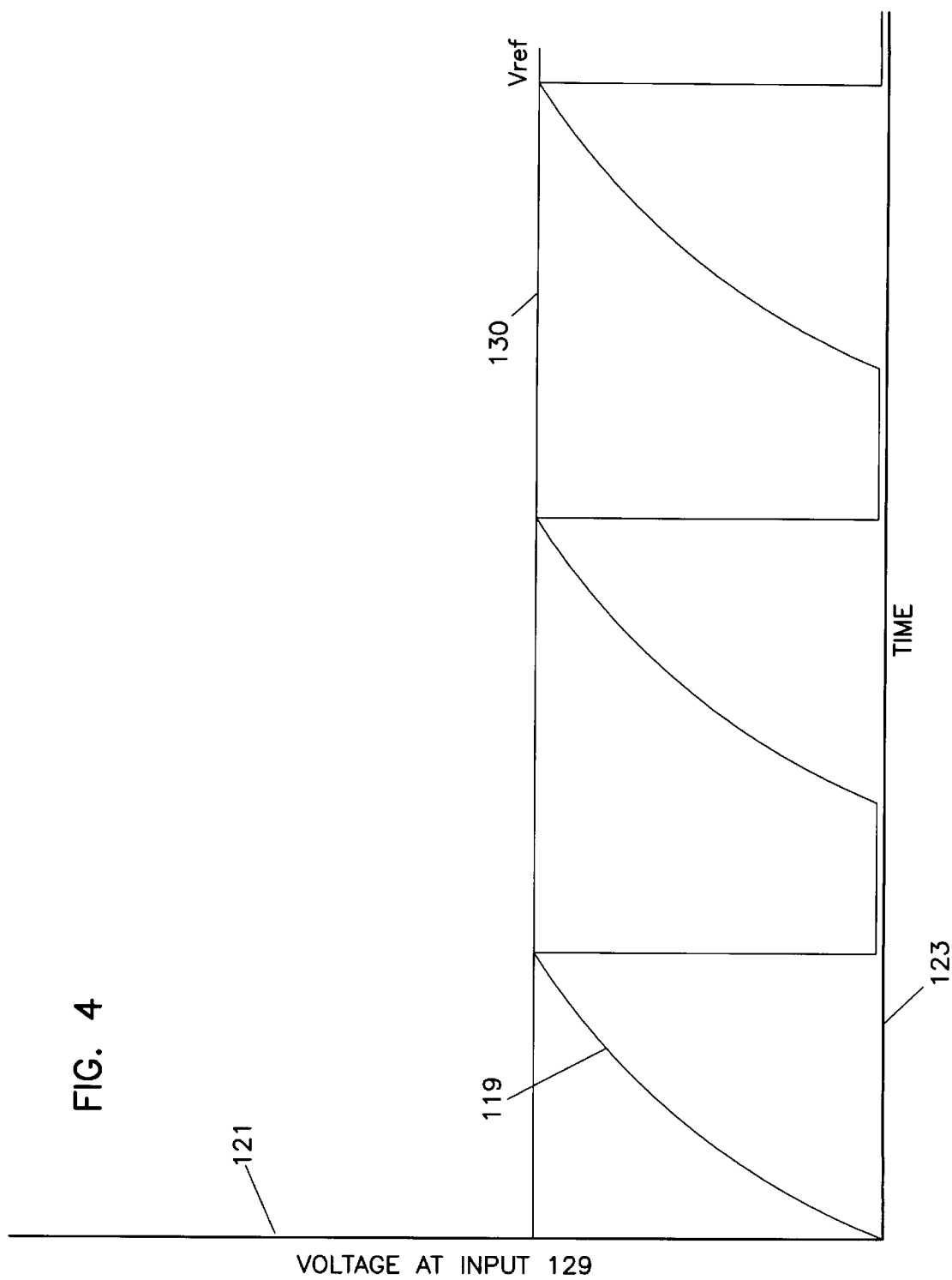
FIG. 4 is a chart depicting coil current as a function of time.

Detector 128, which is essentially a comparator, has a reference voltage $V_{ref}$ 130 coupled to its second input such that detector 128 toggles its output when the current flowing through current sense resistor 126 generates a voltage at the first input of detector 128 which is equal to or greater than $V_{ref}$ 130. The output of detector 128 is provided to one shot circuit 132 which responds to the toggled output of detector 128 by providing a signal to the selected drive circuit 124 which causes that drive circuit to inhibit current flow through the corresponding coils 118 for a predetermined duration. At the end of the predetermined duration, one shot 132 releases the inhibit signal and the selected drive circuit 124 again causes current to begin flowing through corresponding coils 118. This process continues repeatedly. In this manner, the current flow through coils 118 is limited by $V_{ref}$ as indicated generally in FIG. 4 which depicts voltage 119 at input 129 plotted on a graph with voltage and time as its axes 121 and 123, respectively.

As spindle 106 begins to rotate, commutator 122 selects a different drive circuit 124 and corresponding coils 118 for energization, but the current limiting process is substantially unaffected by the commutation of coils 118.

The prior art control of current to spindle motor 108 suffers from various limitations. First, certain components of circuit 121 operate within various tolerances, such that their exact value is not known. Specifically, current sense resistor 126 typically has a tolerance of about +/−1%. Additionally, the coupling of current sense resistor 126 to ground can add a further resistance the exact value of which is not known. Further, voltage reference 130 of the prior art is typically a 100 millivolt voltage source which has a tolerance of +/−10%. Further still, detector 128 also generally has a tolerance of +/−10%. As can be seen, the various errors can combine to provide a relatively large potential swing in drive current to coils 118. Although more precise voltage reference sources have been provided in the past, such voltage references were generally not compatible with the complementary metal oxide semiconductor (CMOS) circuitry which provides many advantages to current disc drives.

The fixed current threshold provided by $V_{ref}$ 130 also adds limitations to the prior art. Specifically, as a disc drive wears, certain components may change their electrical values such that $V_{ref}$ 130 may not provide the optimal current threshold signal as the drive ages. Additionally, it is known that various components vary their resistance in response to temperature changes. In the prior art, the wide range of thermal operating conditions to which a customer may expose drive 100 may also affect circuitry 121 to an extent that an incorrect current may be provided to coils 118.

Prior art current control of spindle motors can cause an array of problems. First, if the current provided to the coils is too low, it is possible that the coils may not be able to generate sufficient magnetic field strength to even begin rotation of the disc. Further, even if enough current is provided to begin rotation, the amount of excess torque which can be applied to accelerating the disc may be so small that it takes many seconds for the disc to spin up to operating speed. Both of these conditions are highly undesirable.

If the current is too high, the significant draw of current by the spindle motor may cause a user's power supply (not shown) to erroneously detect an overcurrent condition in the user's computer and shut down the entire computer system. This condition is also highly undesirable.

Finally, the consequence of widely varying current demands by disc drive spindle motors is that consumer power supplies must be designed to accommodate the widely varying current demands. As a result, costs of designing and manufacturing those power supplies are likely to be higher than if such power supplies could be designed for a specific current demand with tighter tolerances.

Figure 5:
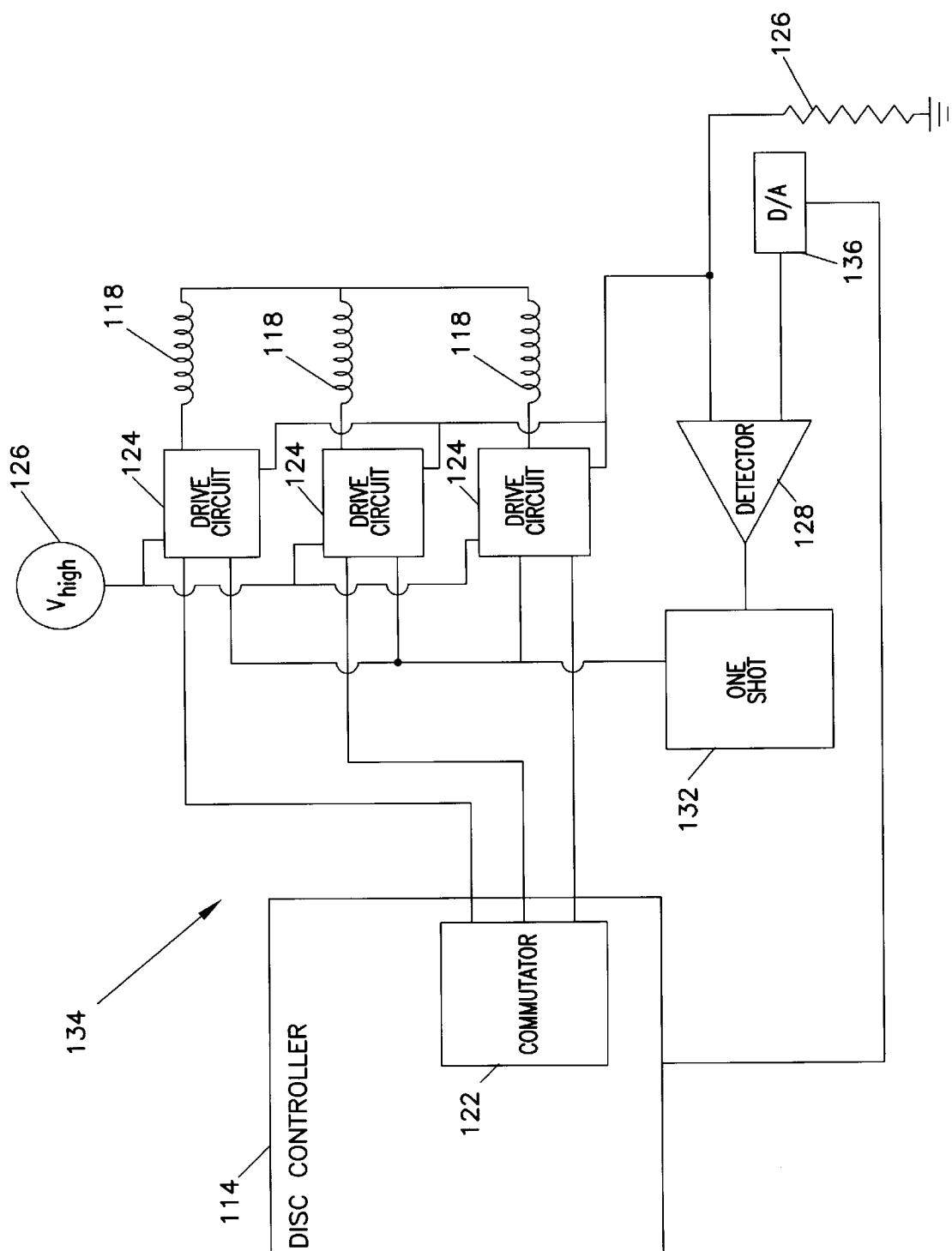
FIG. 5 is a block diagram of circuit 134 for limiting coil current in accordance with the present invention.

FIG. 5 is a block diagram of a circuit 134 in accordance with the present invention. Circuit 134 has many similarities to circuit 121 as shown in FIG. 3, and similar components are numbered similarly. Circuit 134 operates similarly to circuit 121 (shown in FIG. 3) except that $V_{ref}$ 130 is replaced with D/A converter 136. D/A converter 136 is coupled to disc controller 114 such that D/A converter 136 receives a digital command from disc controller 114 and provides an analog output to the second input of detector 128 based on the digital command. Further, D/A converter 136 is preferably designed to provide a large number of discrete analog levels to detector 128 in response to various digital commands. More preferably, D/A converter 136 has at least six bit resolution such that at least 64 different analog levels may be provided to detector 128. It should be noted that any appropriate number of bits may be used in the resolution of D/A converter 136. However, a trade-off exists between cost and resolution.

As can be seen, the provision of D/A converter 136 in place of $V_{ref}$ 130 provides the ability to precisely modify or program a current flow threshold to be provided to coils 118. Further, by using the present invention, the coil current threshold may now be calibrated. For example, D/A converter 136 can be tested such that disc controller 114 can be provided with data corresponding to a relationship between a digital command provided to D/A converter 136 and the corresponding analog output of D/A converter 136 in response thereto. With such calibration, a significant portion of the current control error of the prior art is eliminated.

Figure 6:
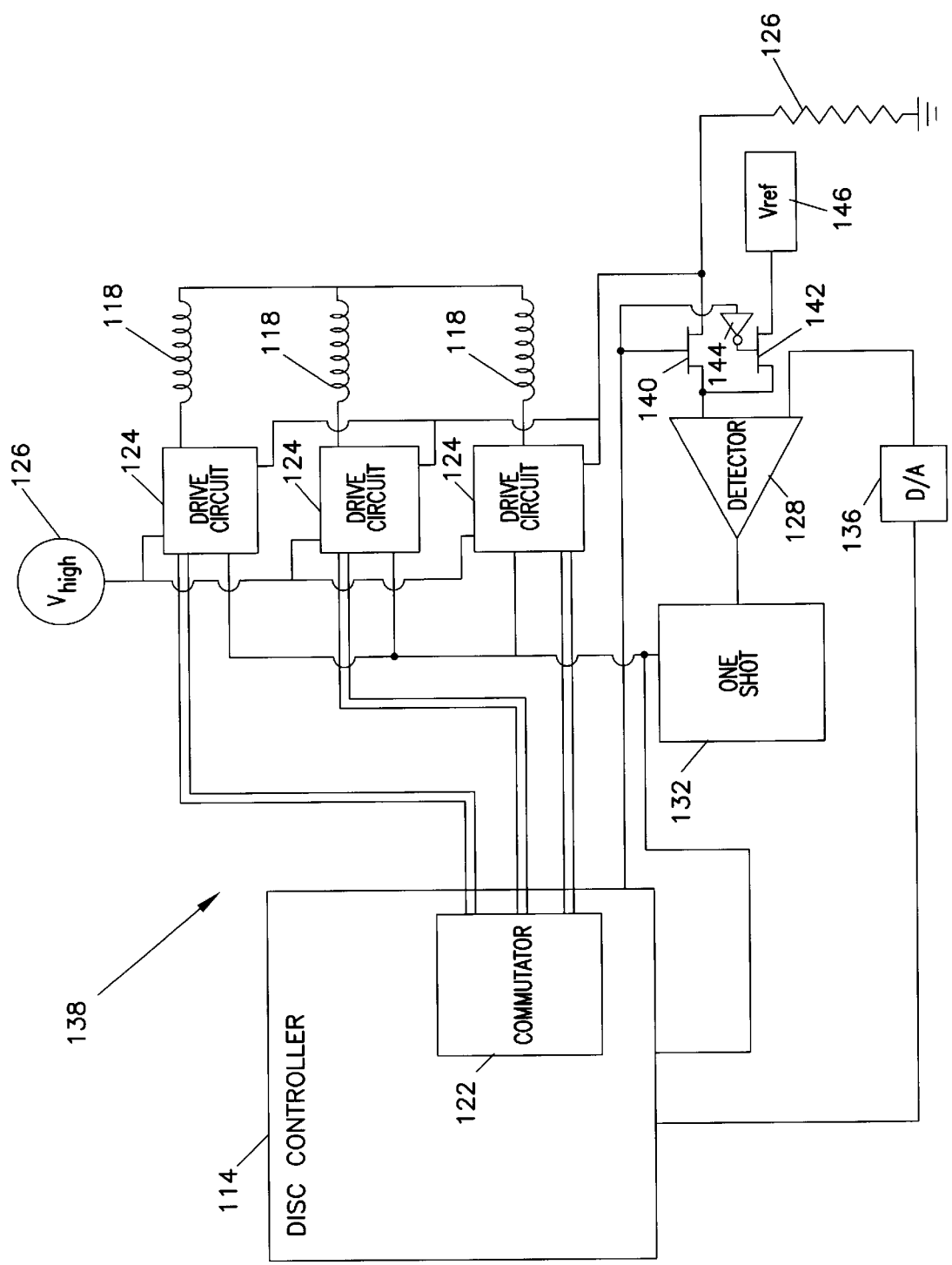
FIG. 6 is a block diagram of circuit 138 for limiting coil current in accordance with one preferred embodiment of the present invention.

FIG. 6 is a block diagram of circuit 138 in accordance with the preferred embodiment of the present invention. Circuit 138 has many similarities to circuit 134 as shown in FIG. 5, and similar components are numbered similarly. The main differences between circuit 138 and circuit 134 reside in switches 140, 142, gate 144 which performs a logical "not" operation, and $V_{ref}$ 146. Switches 140 and 142 are preferably field effect transistors (FET's), and are referred to as such in the remaining description.

FET 140 is coupled to disc controller 114 and is interposed between current sense resistor 126 and the first input of detector 128, such that current sense resistor 126 may be selectively coupled to the first input of detector 128 based upon a control signal received by FET 140 from disc controller 114. The control signal provided by disc controller 114 to FET 140 is also inverted and provided to second FET 142 such that when FET 140 is engaged, FET 142 is disengaged, and conversely. $V_{ref}$ 146 is preferably a precision voltage source with a precision better than +/−10%. $V_{ref}$ 146 is coupled to second FET 142 such that $V_{ref}$ can be selectively coupled to the first input of detector 128. During normal operation, FET 140 is closed, and FET 142 is opened such that circuit 138 behaves precisely as circuit 134 described with respect to FIG. 5.

Figure 7:
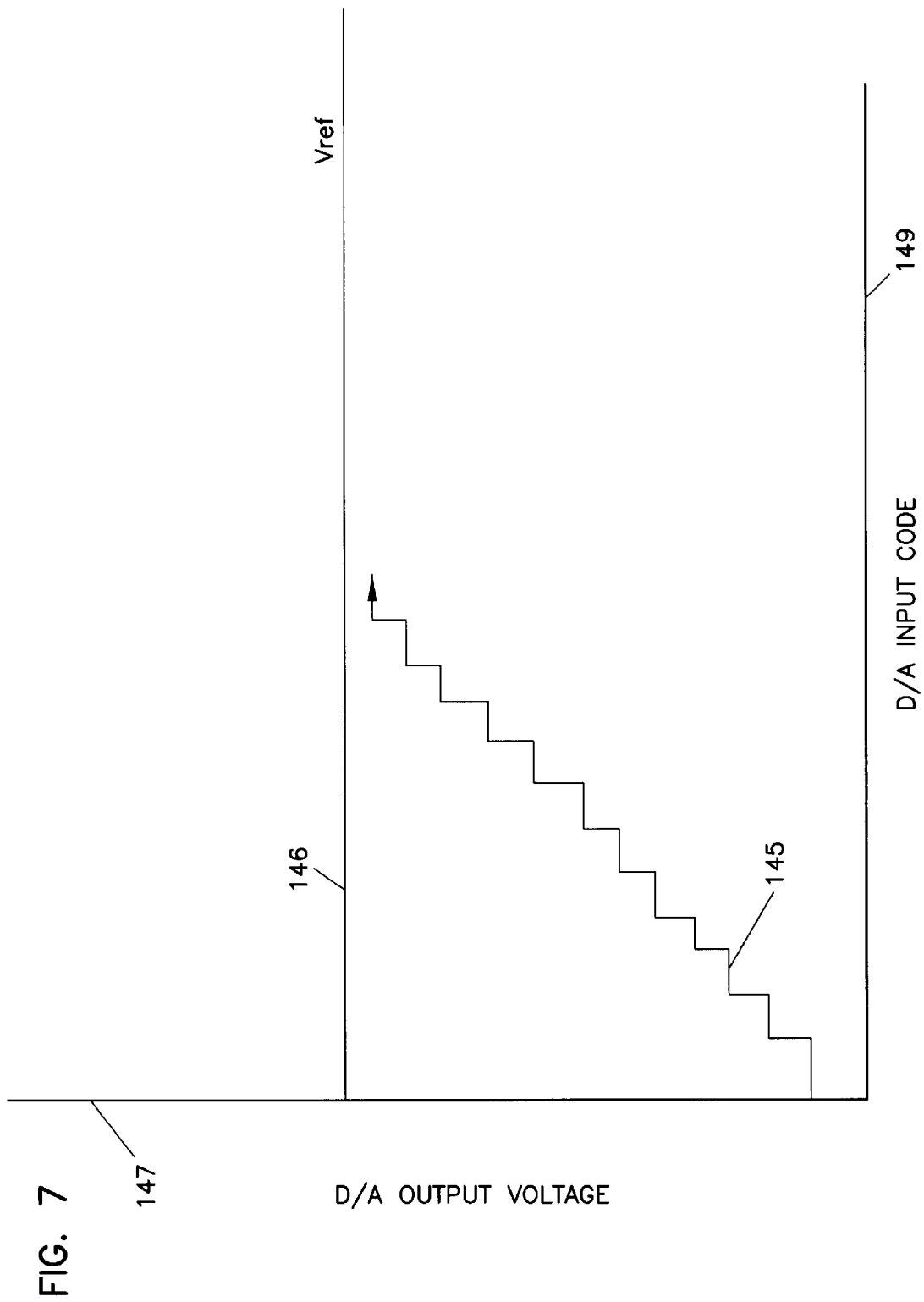
FIG. 7 is a chart of digital-to-analog (D/A) converter output as a function of time during calibration in accordance with the present invention.

The configuration of circuit 138 allows for periodic automatic calibration of the current threshold value. The calibration of circuit 138 will now be described with respect to FIGS. 6–8. Initially, when drive 100 is powered up, disc controller 114 detects the power up and initiates the calibration routine. However, it should be noted, that disc 114 may initiate the calibration routine at other times as well, for example, during a warm-boot. Upon initiation of the calibration routine, disc controller 114 provides a signal to FET's 140 and 142 which signal causes FET 140 to open, and FET 142 to close. Thus, $V_{ref}$ 146 is provided to the first input of detector 128. Subsequently, disc controller 114 provides an initial command word to D/A converter 136 which command causes D/A converter 136 to provide an initial analog signal to the second input of detector 128 as indicated by block 148 in FIG. 8. Preferably, the initial analog signal 145 from D/A converter 136 is selected to be lower than the voltage level of $V_{ref}$ 146, as indicated in FIG. 7 which depicts a graph with D/A output voltage and D/A input code as its axes 147 and 149 respectively.

Figure 8:
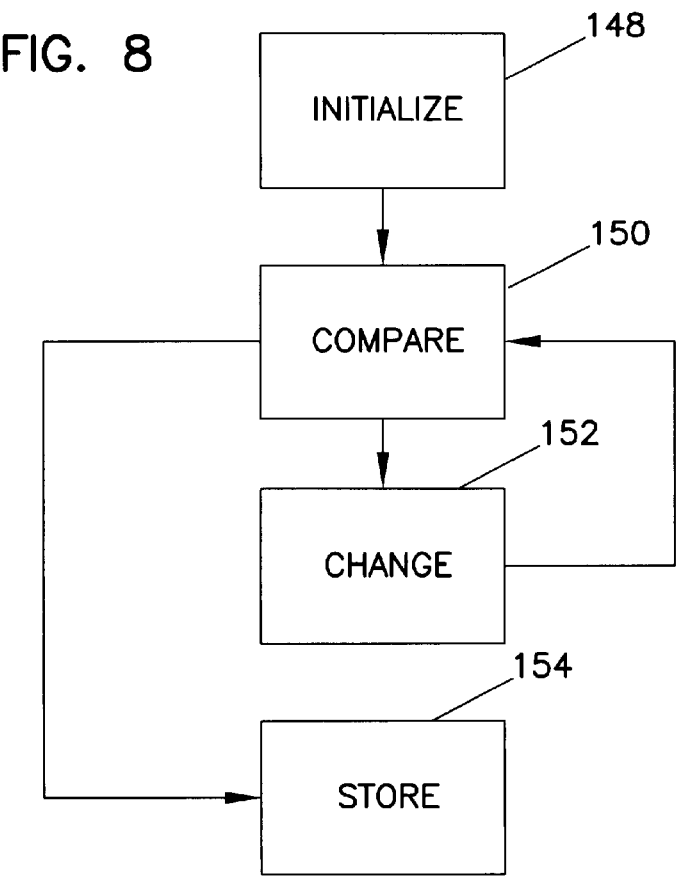
FIG. 8 is a block diagram of a sequence of steps to calibrate the current limiting circuit in accordance with the present invention.

Disc controller 114 subsequently compares a voltage level of $V_{ref}$ 146 to the analog signal of D/A converter 136 by monitoring the output of one shot 132 as indicated by block 150 in FIG. 8. Disc controller 114 then sends a new command word to D/A converter 136, which command word is the previously issued command changed preferably by a value of one, as indicated at block 152 in FIG. 8. The new command which is issued to D/A converter 136 causes D/A converter 136 to change, and preferably increase, the voltage of the analog signal provided to the second input of detector 128. Disc controller 114 monitors the output of one shot 132 and repeatedly steps the command to D/A converter 136 such that the output 145 of D/A converter 136 preferably increases stepwise as appears in FIG. 7. When the output 145 of D/A converter 136 is finally within a selected range of the voltage of $V_{ref}$ 146, the output of one shot 132 toggles in the manner previously described. When disc controller 114 recognizes that the output of one shot 132 has toggled, disc controller 114 stores the last command word provided to D/A converter 136 as indicated by block 154 in FIG. 8. The stored command word represents the calibration value for circuit 138. It should be noted that controller 114 could also monitor detector 128 in order to perform the comparison between the voltage of $V_{ref}$ 146 and the analog signal of D/A converter 136.

After calibration, disc controller 114 sends a signal to FET's 140 and 142 which causes FET 140 to close, and FET 142 to open such that normal operation of the drive may begin. Further, disc controller 114 provides the calibrated command word to D/A converter 136 such that the current to coils 118 is limited based upon the calibration.

The above-described calibration reduces, or eliminates offset error inherent in detector 128, and additional errors inherent in D/A converter 136. The following example will illustrate such reduction. Assume D/A converter 136 has a +/−10% tolerance and actually provides a 0.09 volt output when a 0.10 volt output is desired. Assume further, that detector 128 has a +/−10% tolerance such that detector 128 will register a match when the second input is 10% more than the first input. Assume further that $V_{ref}$ 146 provides a precise 0.10 volt reference. During calibration, the precise 0.10 volt reference of $V_{ref}$ 146 is provided to detector 128. However, when a command which theoretically would correspond to 0.10 volts at D/A converter 136 is provided to D/A converter 136 such command merely generates a 0.09 volt output. Further, in order to register a match, detector 128 requires that the second input voltage be 10% higher than the first input voltage. Thus, D/A converter 136 must be stepped sufficiently to increase the analog output approximately 0.02 volts in order to get detector 128 to toggle its output. As can be seen, the 20% increase to D/A converter 136 substantially removes error presented by D/A converter 136 and the input offset of detector 128.

Figure 9:
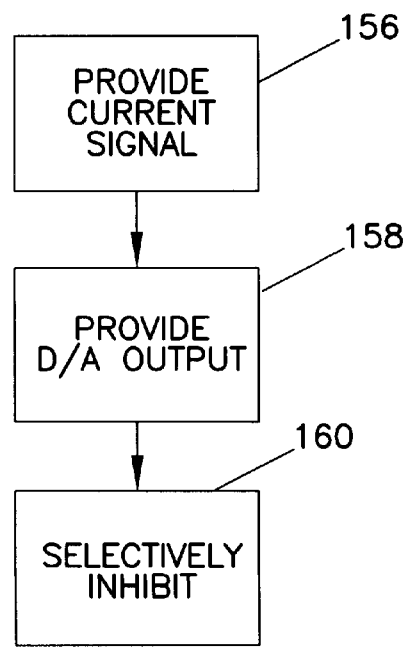
FIG. 9 is a block diagram of a sequence of steps to control coil current in accordance with the present invention.

FIG. 9 is a block diagram of a sequence of steps to control coil current in accordance with the present invention. As can be seen, a current signal and D/A output are provided as indicated by blocks 156 and 158, respectively. Current through the coils is selectively inhibited for a predetermined duration based upon a comparison between the current signal and the D/A output, as indicated by block 160.

In conclusion, the present invention includes a disc drive including an apparatus for limiting current flow in coils of the disc drive spindle motor. The apparatus includes a detector 128 which has a first input, second input, and an output which provides an output signal responsive to a comparison between the first and second inputs. The apparatus also includes a current sensor 126 coupled to coils 118 and the first input such that the current sensor 126 provides a signal to detector 128 which is indicative of current flow through coils 118. Further, the apparatus also includes a configurable voltage source 136 coupled to the second input and providing a signal thereto based upon a configuration signal received by voltage source 136. The apparatus also includes a controller 114 which is coupled to the configurable voltage source 136 and provides the configuration signal to the configurable voltage source 136. Further, the apparatus also includes a current inhibitor 132 which is coupled to the output of the detector 128 and coils 118 such that the inhibitor 132 selectively inhibits current flow through the coils 118 based on the output signal. Preferably, the configurable voltage source 136 is a digital-to-analog converter 136.

Preferably, the apparatus also includes a voltage source 146 which is selectably couplable to the first input of detector 128. It is also preferred that voltage source 146 have a precision better than +/−10%. Additionally, the apparatus preferably includes a first switch 140 which is coupled to the controller 114 such that it is electrically interposed between the current sensor 126 and the first input of the detector 128. Additionally, the apparatus also preferably includes a second switch 142 which is-coupled to controller 114 such that second switch 142 is electrically interposed between reference voltage 146 and the first input of detector 128. It is also preferred that the first and second switches 140, 142 are field effect transistors, which are matched together and have low resistances. Finally, it is also preferred that the apparatus include an inverter 144 which couples the second switch 142 to the first switch 140 such that the coupling of the second switch 142 to the controller 114 is through the inverter.

The present invention also includes a method of calibrating a current control threshold with a reference voltage source 146 in a disc drive spindle motor 108. The method includes the steps of setting a configurable voltage source 136 to provide a voltage which is different from an expected voltage of the reference voltage source 146. The method also includes the step of comparing the voltage of the configurable voltage source 136 to a voltage of the reference voltage source 146. Also included in the method is the step of changing the voltage of the configurable voltage source 136 stepwise toward the expected voltage of the reference voltage source 146 until the comparing step indicates that the voltages are within a desired range of one another. Finally, the method also includes storing data indicative of a setting of the configurable voltage source 136 which cause the configurable voltage source 136 to provide a voltage which is within the desired range of the reference voltage source 146.

It is to be understood that even though numerous characteristics and advantages of various embodiments of the present invention have been set forth in the foregoing description, together with details of the stricture and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application without departing from the scope and spirit of the present invention. In addition, although the preferred embodiment described herein is directed to an apparatus for controlling current in a magnetic disc drive system, it will be appreciated by those skilled in the art that the teachings of the present invention can be applied to systems which implement non-contact, contact, and proximity recording and in other systems, like magneto-optical disc drive systems, without departing from the scope and spirit of the present invention.

What is claimed is:

1. An apparatus for limiting current in a coil of a disc drive spindle motor, the apparatus comprising:

a current sensor operatively coupled to the coil and providing a signal which is indicative of current flow through the coil;

a configurable voltage source responsive to a control signal received by the configurable voltage source to provide a calibrated voltage output; and a current inhibitor operatively coupled to the current sensor and configurable voltage source, the inhibitor selectively inhibiting current flow through the coil based on results of a comparison between the current sensor signal and the calibrated voltage output supplied by the configurable voltage source.

2. The apparatus of claim 1 wherein the configurable voltage source is a digital-to-analog converter.

3. The apparatus of claim 2 wherein the configurable voltage source has a resolution of at least six bits.

4. The apparatus of claim 1 and further comprising reference voltage source with a precision better than +/−10%.

5. The apparatus of claim 1 and further comprising a controller operatively coupled to the configurable voltage source, and providing the control signal.

6. The apparatus of claim 5 and further comprising:

a first switch operatively coupled to the controller and electrically interposed between the current sensor and the current inhibitor; and a second switch operatively coupled to the controller and electrically interposed between the reference voltage and the current inhibitor.

7. The apparatus of claim 6 wherein the first and second switches are field effect transistors.

8. The apparatus of claim 6 and further comprising an inverter operatively coupling the second switch to the first switch, wherein the coupling of the second switch to the controller is through the inverter.

9. A disc drive comprising:

a disc;

a head configured to read and write data upon the disc;

a spindle motor operatively coupled to the disc, the spindle motor including;
a non-rotating member;
a spindle rotatably coupled to the non-rotating member;
energization coils configured to rotatably urge the spindle upon coil energization;

a controller operatively coupled to the spindle motor and the head; and a coil current limiter coupled to the spindle motor and the controller for limiting an energization current to the coils, the current limiter including:
a current sensor operatively coupled to the coils and providing a signal which is indicative of current flow through the coils;
a configurable voltage source responsive to a control signal received by the configurable voltage source to provide a calibrated voltage output; and
a current inhibitor operatively coupled to the current sensor and configurable voltage source, the inhibitor selectively inhibiting current flow through the coils based on results of a comparison between the current sensor signal and the calibrated voltage output supplied by the configurable voltage source.

10. The apparatus of claim 9 wherein the configurable voltage source is a digital-to-analog converter.

11. The apparatus of claim 10 wherein the configurable voltage source has a resolution of at least six bits.

12. The apparatus of claim 9 and further comprising a controller operatively coupled to the configurable voltage source, and providing the controls signal.

13. The apparatus of claim 9 and further comprising a reference voltage source with a precision better than +/−10%.

14. The apparatus of claim 13 and further comprising:

a first switch operatively coupled to the controller and interposed between the current sensor and the inhibitor; and a second switch operatively coupled to the controller and interposed between the reference voltage and the inhibitor.

15. The apparatus of claim 14 wherein the first and second switches are field effect transistors.

16. The apparatus of claim 14 and further comprising an inverter operatively coupling the second switch to the first switch, wherein the coupling of the second switch to the controller is through the inverter.

17. A method of controlling current flow through energization coils in a disc drive spindle motor comprising steps of:

providing a first signal indicative of a current flowing through the coils;

providing a calibrated second signal indicative of a control signal provided to a configurable source; and selectively inhibiting current flow through the coils for a predetermined duration based upon results of a comparison between the first and second signals.

18. The method of claim 17 wherein the configurable source is a digital-to-analog converter and the second signal is a voltage signal.

19. The method of claim 18 wherein the configurable source has a resolution of at least six bits.

* * * * *